UNITED STATES PATENT OFFICE.

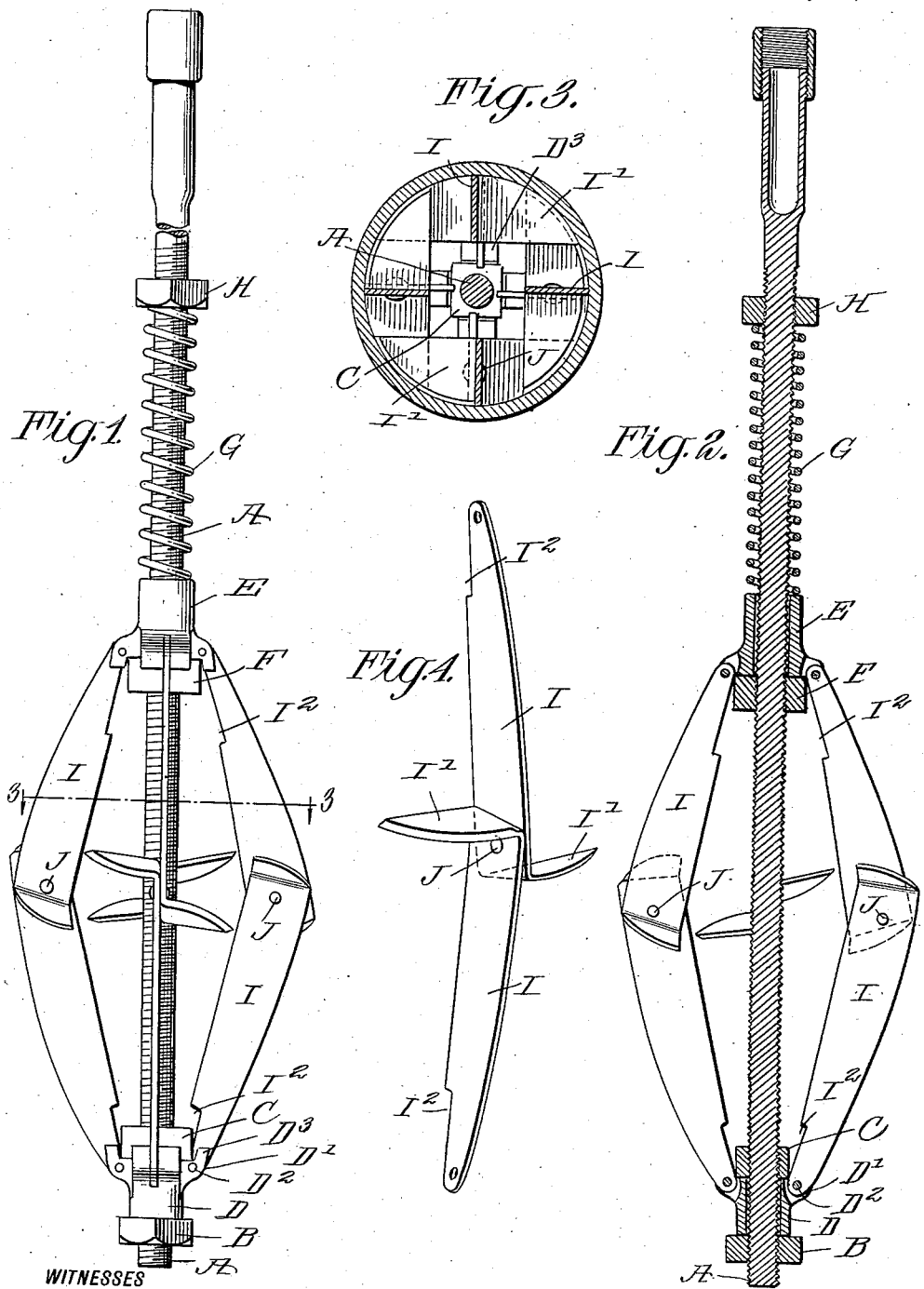

HOLDEN C. McKEEL, OF NEWBERN, NORTH CAROLINA, AND JOSEPH GRIFFIN, OF LITTLE RIVER, SOUTH CAROLINA.

FLUE-CLEANER.

1,026,525.            Specification of Letters Patent.          Patented May 14, 1912.

Application filed December 15, 1911. Serial No. 665,983.

*To all whom it may concern:*

Be it known that we, HOLDEN C. MCKEEL and JOSEPH GRIFFIN, citizens of the United States, and residents, respectively, of Newbern, in the county of Craven and State of North Carolina, and Little River, in the county of Horry and State of South Carolina, have invented certain new and useful Improvements in Flue-Cleaners, of which the following is a specification.

This invention is an improvement in flue cleaners and relates especially to the particular construction of the scrapers proper whereby to secure an efficient, economical and durable form of scraper; and the invention consists in certain novel constructions and combinations of parts as will be hereinafter described and claimed.

In the drawing Figure 1 is a side view and Fig. 2 a longitudinal section of a cleaner embodying our invention. Fig. 3 is a cross section on about line 3—3 of Fig. 1. Fig. 4 is a detail perspective view showing the pair of scraper blades pivoted together.

As shown, the cleaner includes a shaft A on which is fixed by nuts B and C an abutment D which abutment has lugs $D'$ to which the blades are pivoted at $D^2$ and the said lugs $D'$ are also provided with ears or projections $D^3$ which lap alongside the nut C and lock the same from turning when the abutment D is pressed by the nut B to the position shown in Figs. 1 and 2 of the drawing.

A slide E is movable along the shaft A, its movement being limited in one direction by a stop nut F which may be adjusted along the shaft A, the slide E being pressed toward and against the stop nut F by a spring G whose tension may be adjusted by a nut H as will be understood from Figs. 1 and 2 of the drawing.

The scrapers are arranged in pairs, each scraper being composed of two similar blades I, see Fig. 4. By preference, we make these blades out of sheet steel, such for instance, as is ordinarily employed in the manufacture of saw blades, and we find it desirable to make these scraper blades by cutting them from old worn out saw blades as thereby we secure a superior quality of steel at a small initial cost. These blades are jointed at the outer ends of each pair, one to the abutment D and the other to the slide E so that the pair of blades form practically a toggle between the slide and the abutment. Thus the movement of the slide toward and from the abutment expands and contracts the cleaner as will be understood from Figs. 1 and 2.

At their inner ends the blades I are provided with laterally projecting scraping wings $I'$ which are arranged at an angle to the body portions of the blades and are preferably disposed as best shown in Fig. 1, at an angle less than a right angle to their respective body portions. The body portions of the blades are lapped side by side adjacent to their scraping wings $I'$ and these lapped portions are pivoted together at J as best shown in Figs. 1, 2 and 4, permitting the adjustment of the scraper to fit the larger and smaller flues, as may be desired. As best shown in Figs. 1, 2 and 4, the scraping wings $I'$ are at the extreme inner ends of their blades and the pivot J is arranged between the scraping wings and the joint between the outer ends of the blades and the abutment, or the slide, as the case may be.

It will be noticed that the body portions of the blades are set radially edgewise and that the special construction of the blades enables the construction of a strong, efficient and durable cleaner at a comparatively small initial cost. At the same time, the construction shown, permits the convenient adjustment of the tension of the spring G to suit the cleaner to flues of different sizes.

At their outer ends on their inner edges, the blades I are cut away at $I^2$ to permit them to move inwardly without coming in contact with the nuts C or F.

We claim:

1. A flue cleaner composed of a shaft, an abutment thereon, a slide movable along the shaft, means for yieldingly pressing the slide along the shaft, a series of similar scrapers each composed of a pair of blades, the blades of each pair being jointed at their outer ends, one to the abutment and the other to the slide and stop nuts on the shaft, the said blades being composed of body portions set radially edgewise and scraping wings one for each of the blades of the pair bent laterally at an angle to the body portions and the body portions being lapped side by side and pivoted together adjacent to their scraping wings, substantially as set forth.

2. In a flue cleaner, a scraper composed of a pair of flat blades each blade having at one end a laterally projecting scraping wing at an angle to the body of its blade, the said blades having their body portions lapped side by side adjacent to their scraping wings with their lapped portions pivoted together, the scraping wings being at the inner extremities of their blades and the pivotal connection between the blades being located between said wings and the opposite ends of their respective blades, substantially as set forth.

3. A flue cleaner comprising a shaft, an abutment thereon, a slide movable along the shaft, a series of scrapers composed each of a pair of flat blades whose outer ends are pivoted respectively to the slide and abutment, the said blades having at their inner ends laterally projecting scraping wings at an angle to the body portions of the blades and the said blades being lapped side by side adjacent to their scraping wings and pivots connecting the lapped portions of the scraping wings, said pivots being located between the scraping wings and the opposite ends of their respective blades, substantially as and for the purposes set forth.

HOLDEN C. McKEEL.
JOSEPH GRIFFIN.

Witnesses to the signature of Holden C. McKeel:
CLARA BREWER,
W. N. PUGH.

Witnesses to the signature of Joseph Griffin:
W. E. BESSENT,
W. H. STONE.

Copies of this patent may be obtained for five cents each, by addressing the "Commissioner of Patents, Washington, D. C."